US012293493B1

(12) United States Patent
Xiong et al.

(10) Patent No.: US 12,293,493 B1
(45) Date of Patent: May 6, 2025

(54) HARDWARE-BASED PROTECTION OF PRIVATE CONTENT CAPTURED BY A CAMERA DEVICE

(71) Applicant: META PLATFORMS TECHNOLOGIES, LLC, Menlo Park, CA (US)

(72) Inventors: Shaomin Xiong, Newark, CA (US); Lidu Huang, Danville, CA (US); Michael Andrew Brookmire, Half Moon Bay, CA (US); Dongmin Yang, San Jose, CA (US); Fei Liu, Los Altos, CA (US); Yizhi Xiong, Foster City, CA (US); Zhaochun Yu, Wilmette, IL (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 247 days.

(21) Appl. No.: 18/179,286

(22) Filed: Mar. 6, 2023

(51) Int. Cl.
  *G06T 5/70* (2024.01)
  *G06T 7/70* (2017.01)
  *H04N 23/67* (2023.01)

(52) U.S. Cl.
  CPC ............... *G06T 5/70* (2024.01); *G06T 7/70* (2017.01); *H04N 23/67* (2023.01); *G06T 2207/20132* (2013.01)

(58) Field of Classification Search
  CPC ..... G06T 5/70; G06T 7/70; G06T 2207/20132; H04N 23/67
  USPC ......................................................... 382/264
  See application file for complete search history.

(56) References Cited

U.S. PATENT DOCUMENTS

2018/0063509 A1\* 3/2018 Koppal ................ H04N 13/239

\* cited by examiner

*Primary Examiner* — Stephen P Coleman
(74) *Attorney, Agent, or Firm* — Freestone Intellectual Property Law PLLC; Aaron J. Visbeek

(57) ABSTRACT

One embodiment of the present invention sets forth a technique for intelligently accessing one or more different hardware-based mechanisms for cropping out, blurring or blocking private content in a live preview image generated for the camera and in media recorded by the camera. The technique incudes receiving input regarding a plurality of objects to be concealed in media captured by an imaging device and identifying at least one of the plurality of objects in a field of view of the imaging device. Further, the technique includes modifying the at least one of the plurality of objects in a live preview image or media captured by the imaging device using one or more hardware-based actuators, where the modifying the at least one of the plurality of objects causes the one of the plurality of objects to be concealed.

20 Claims, 7 Drawing Sheets

HARDWARE-BASED PROTECTION OF PRIVATE CONTENT CAPTURED BY A CAMERA DEVICE

BACKGROUND

Field of the Various Embodiments

Various embodiments relate generally to camera devices, and more specifically, to techniques for protecting private information when capturing media content using the camera devices.

DESCRIPTION OF THE RELATED ART

Cameras are increasingly integrated into handheld, wearable and other types of consumer electronic devices and can serve various functions. For example, wearable devices such as virtual reality (VR), augmented reality (AR), and/or mixed reality (MR) headsets commonly include cameras that capture the physical space around a user and can also be used for, among other things, eye tracking, environmental sensing and depth perception. Privacy is a key concern as cameras are integrated into everyday devices and, in particular, into wearable devices including smart glasses, wearable headsets, etc., which can capture footage without subjects being aware that they are being recorded. In certain circumstances, the subjects may object to being captured on media or may have other privacy concerns regarding the content.

Generalized methods of filtering out and removing (e.g., by blurring or blocking) sensitive contents in an image (or video) captured by a camera involve post-processing in software. Software-based post processing consumes extra time, power and resources and the quality of the filtering can depend heavily on the software algorithms utilized. If the post-processing algorithm is of poor quality, much of the sensitive information that has been removed can be easily recovered. Another problem with using software-based methods of removing content from images or videos is that most cameras typically save the raw data from the images or videos. This raw data can also be used to recover private information. Further, it is challenging for a third party or a subject that is being captured to ensure whether the sensitive or private information has been removed adequately. Accordingly, post-processing solutions for filtering and removing private information from media are inadequate in circumstances where it is important not to preserve any record of the information that needs to be removed.

As the foregoing illustrates, what is needed in the art is a more effective approach to transcribing auditory experiences.

SUMMARY

One embodiment of the present invention sets forth a technique for removing private content from media recorded using a camera. The technique incudes receiving input regarding a plurality of objects to be concealed from media captured by an imaging device and identifying at least one of the plurality of objects in a field of view of the imaging device. Further, the technique includes modifying the at least one of the plurality of objects in a live preview image or media captured by the imaging device using one or more hardware-based actuators, where the modifying the at least one of the plurality of objects causes the one of the plurality of objects to be concealed. The technique incudes receiving input regarding a plurality of objects to be identified and removed from media captured by the camera. The technique further includes identifying at least one of the plurality of objects during a live preview mode of the camera, wherein during the live preview mode a display screen of the camera acts as a viewfinder and displays a live preview of what the camera is currently pointing at. The technique also includes obscuring the at least one of the plurality of objects from the live preview mode or media captured by the camera using a hardware actuator. In some embodiments, the hardware actuator can include an Optical Image Stabilization (OIS) actuator, an aperture actuator, a sensor actuator and an autofocus actuator.

Other embodiments of the present disclosure include, without limitation, a computer-readable medium including instructions for performing one or more aspects of the disclosed techniques as well as a computing device for performing one or more aspects of the disclosed techniques.

At least one advantage of the disclosed techniques is that it provides a more efficient and robust mechanism for filtering out and removing content from a live preview of the camera or any media captured by the camera than software-based mechanisms. Because the private content is removed using hardware-based mechanisms, no additional processing time following the capture of an image or video is necessary to remove private content. Unlike software-based mechanisms that can be error prone and dependent on the quality of software algorithms, the hardware-based mechanisms remove content from media captured by the camera in a way that precludes any ability to recover private or sensitive information. Accordingly, an operator of the camera and a subject being captured can both be assured that none of their private information is being exposed and further that none of the information can be recovered. For cameras integrated into wearable devices, such as smart glasses, using hardware-based mechanisms that do not allow private information to be recovered, leads to an additional level of trust in such devices for both the users of the wearable devices and any bystanders (or the general public, at large). Additionally, disclosed techniques allows third parties to easily verify whether information has been removed from recorded media.

For these reasons, the disclosed techniques represent a technological advancement compared to prior approaches that use software-based post-processing methods to filter out sensitive content in images or videos recorded by a camera.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
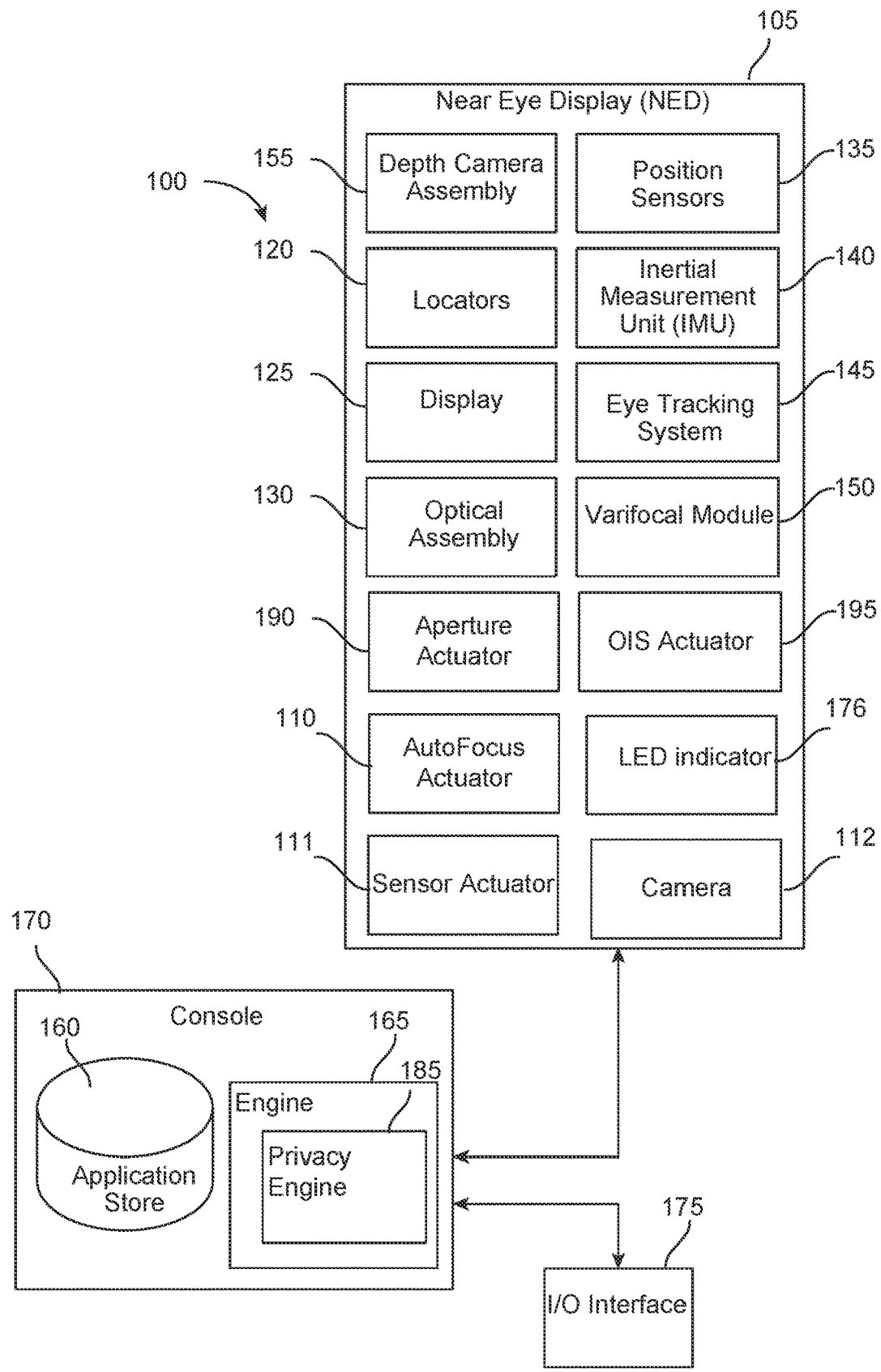
FIG. 1 is a block diagram of an embodiment of a near-eye display (NED) system in which a console operates, according to various embodiments.

In the following description, numerous specific details are set forth to provide a more thorough understanding of the various embodiments. However, it will be apparent to one of skilled in the art that the inventive concepts may be practiced without one or more of these specific details.

Overview

As noted above, generalized methods of filtering out and removing (e.g., by blurring or blocking) sensitive contents in an image (or video) captured by a camera involve post-processing in software, which results in additional computational and time costs. Further, software-based post-processing solutions for removing private information from media can vary in quality and can be inadequate in circumstances where it is important not to preserve any record of the information that needs to be removed.

To address these issues, various embodiments include a privacy engine configured to intelligently access one or more different hardware-based mechanisms for cropping out, blurring or blocking private content in a live preview image generated for the camera and from media recorded by the camera. The live preview image is a live image generated for display on a camera or phone screen that allows the user to view the image prior to capturing it in the form of media content, for example, images or videos. The technique incudes receiving input (e.g., user-based input) regarding a plurality of objects to be identified and removed from a live preview image or media captured by the camera. The technique further includes identifying at least one of the plurality of objects during a live preview mode of the camera, wherein during the live preview mode a display screen on the camera acts as a viewfinder and displays a live preview of a scene at which the camera is currently pointing. Note that in cameras that do not support a live preview mode, at least one of the plurality of objects may be identified when the object appears in a field of view of the lens and are observed through a viewfinder. The technique also includes obscuring the at least one of the plurality of objects from the live preview mode or media (e.g., images or videos) captured by the camera using a hardware actuator. One of several different types of hardware actuators may be utilized, including but not limited to: a) an autofocus actuator; b) an aperture actuator; c) a sensor actuator and d) an optical image stabilization (OIS) actuator.

The privacy engine can use the hardware-based actuators in combination to automatically change or influence the depth of field, field of view and sensor position in such a way that selectively removes or blurs out certain private or sensitive information in the image. In some embodiments, the autofocus actuator can change the focus of a lens which affects the depth of field and can also indirectly influence the field of view to a lesser degree. For example, the autofocus actuator can adjust the focus to a subject that is determines to be the main subject in the frame, which can cause the background to be out of focus, resulting in a shallow depth of field. In some embodiments, if the privacy engine determines that there is sensitive content in the background at a distance, the privacy engine can use the autofocus actuator to focus on an object at a close distance in order to blur out objects at a farther distance. Similarly, the privacy engine can use the aperture actuator to change the aperture size, which can directly affect the depth of field but also influences the field of view. Controlling the aperture size using the aperture actuator also allows the privacy engine to blur out certain private contents of a live preview image or of an image or video being recorded.

Further, the OIS actuator, which can control both sensor and lens movement, can also be used in destabilization mode to destabilize an image in a controlled fashion so that certain parts of the image can be blurred out. Note that there can be two types of OIS actuators. Some types of OIS actuators can move the camera lens while other types of OIS actuators can create minor shifts in sensor positioning (sensor shift OIS actuators). In some embodiments, OIS actuators may move both the lens of the camera and a sensor positioning. In some embodiments, the privacy engine can control the OIS actuator to create the necessary destabilization in an image to blur or block out certain specific areas of an image or video.

Additionally, the sensor actuator allows the position of the sensor to be changed, thereby, allowing the privacy engine to control the sensor actuator to selectively crop out certain portions of an image. The sensor actuator is typically able to create larger shifts in the sensor position as compared to the sensor shifting capabilities of an OIS actuator.

At least one advantage of the disclosed techniques is that it provides a faster and more robust mechanism for filtering out and removing content from a live preview mode of the camera or any media captured by the camera than software-based mechanisms. Because the private content is removed using hardware-based mechanisms, no additional processing time following the capture of an image or video is necessary to remove private content. Unlike software-based mechanisms that can be error prone and dependent on the quality of software algorithms, the hardware-based mechanisms remove content from media captured by the camera in a way that precludes any ability to recover private or sensitive information. Accordingly, an operator of the camera and a subject being captured can both be assured that none of their private information is being exposed and further that none of the information can be recovered. For cameras integrated into wearable devices, such as smart glasses, using hardware-based mechanisms that do not allow private information to be recovered, leads to an additional level of trust in such devices for both the users of the wearable devices and the general public. Additionally, disclosed techniques allows third parties to easily verify whether information has been removed from recorded media.

Accordingly, the disclosed techniques represent a technological advancement compared to prior approaches that use software-based post-processing methods to filter out sensitive content in images or videos recorded by a camera.

The Artificial Reality System

Embodiments of the disclosure may include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, for example, create content in an artificial reality system and/or are otherwise used in (e.g., perform activities in) an artificial reality system. The artificial reality system may be implemented on various platforms, including a wearable head-mounted display (HMD) connected to a host computer system, a standalone HMD, a mobile device or computing system, or any other hardware platform capable of providing artificial reality content to one or more viewers.

It should be noted that although NEDs and head mounted displays (HMDs) are disclosed herein as reference examples, the camera and privacy engine disclosed herein can also operate on other types of wearable and non-wearable display elements and display devices that include cameras, for example, camera devices including display elements that can be configured for placement in proximity of an eye or eyes of the user, without being head-mounted (e.g., a dash cam that may be mounted in a vehicle). Further, embodiments of the disclosure are not limited to being implemented in conjunction with artificial reality systems and can also be implemented with other types of image and video capturing systems. Also, embodiments of the disclosure can also be implemented in conventional digital cameras.

FIG. 1 is a block diagram of an embodiment of a near-eye display (NED) system 100 in which a console operates, according to various embodiments. The NED system 100 may operate in a virtual reality (VR) system environment, an augmented reality (AR) system environment, a mixed reality (MR) system environment, or some combination thereof. The NED system 100 shown in FIG. 1 comprises a NED 105 and an input/output (I/O) interface 175 that is coupled to the console 170. In various embodiments, the composite display system 100 is included in or operates in conjunction with NED 105. For example, the composite display system 100 may be included within NED 105 or may be coupled to the console 170 and/or the NED 105.

While FIG. 1 shows an example NED system 100 including one NED 105 and one I/O interface 175, in other embodiments any number of these components may be included in the NED system 100. For example, there may be multiple NEDs 105, and each NED 105 has an associated I/O interface 175. Each NED 105 and I/O interface 175 communicates with the console 170. In alternative configurations, different and/or additional components may be included in the NED system 100. Additionally, various components included within the NED 105, the console 170, and the I/O interface 175 may be distributed in a different manner than is described in conjunction with FIGS. 1-2B in some embodiments. For example, some or all of the functionality of the console 170 may be provided by the NED 105 and vice versa.

The NED 105 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 105 may also present audio content to a user. The NED 105 and/or the console 170 may transmit the audio content to an external device via the I/O interface 175. The external device may include various forms of speaker systems and/or headphones. In various embodiments, the audio content is synchronized with visual content being displayed by the NED 105.

The NED 105 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 1, the NED 105 may include a depth camera assembly (DCA) 155, one or more locators 120, a display 125, an optical assembly 130, one or more position sensors 135, an inertial measurement unit (IMU) 140, an eye tracking system 145, a varifocal module 150, an aperture actuator 190, an autofocus actuator 110, an Optical Image Stabilization (OIS) actuator 195 and a light-emitting diode (LED) indicator 176. In some embodiments, the display 125 and the optical assembly 130 can be integrated together into a projection assembly. Various embodiments of the NED 105 may have additional, fewer, or different components than those listed above. Additionally, the functionality of each component may be partially or completely encompassed by the functionality of one or more other components in various embodiments.

The DCA 155 captures sensor data describing depth information of an area surrounding the NED 105. The sensor data may be generated by one or a combination of depth imaging techniques, such as triangulation, structured light imaging, time-of-flight imaging, stereo imaging, laser scan, and so forth. The DCA 155 can compute various depth properties of the area surrounding the NED 105 using the sensor data. Additionally or alternatively, the DCA 155 may transmit the sensor data to the console 170 for processing. Further, in various embodiments, the DCA 155 captures or samples sensor data at different times. For example, the DCA 155 could sample sensor data at different times within a time window to obtain sensor data along a time dimension.

The DCA 155 includes an illumination source, an imaging device, and a controller. The illumination source emits light onto an area surrounding the NED 105. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 105, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 120 are objects located in specific positions on the NED 105 relative to one another and relative to a specific reference point on the NED 105. A locator 120 may be a light emitting diode (LED), a corner cube reflector, a reflective marker, a type of light source that contrasts with an environment in which the NED 105 operates, or some combination thereof. In embodiments where the locators 120 are active (i.e., an LED or other type of light emitting device), the locators 120 may emit light in the visible band (~380 nm to 950 nm), in the infrared (IR) band (~950 nm to 9700 nm), in the ultraviolet band (70 nm to 380 nm), some other portion of the electromagnetic spectrum, or some combination thereof.

In some embodiments, the locators 120 are located beneath an outer surface of the NED 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the NED 105 are opaque in the visible band of wavelengths of light. Thus, the locators 120 may emit light in the IR band under an outer surface that is transparent in the IR band but opaque in the visible band.

The display 125 displays two-dimensional or three-dimensional images to the user in accordance with pixel data received from the console 170 and/or one or more other sources. In various embodiments, the display 125 comprises a single display or multiple displays (e.g., separate displays for each eye of a user). In some embodiments, the display 125 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 125 and used separately, in parallel, and/or in combination.

In some embodiments, the display 125 can display a live preview image of the scene captured by an imaging device incorporated into the NED system 100 (e.g., the imaging device in the depth camera assembly 155). In some embodiments, the display 125 can be connected to a dedicated camera or imaging device configured within the NED system 100 (not shown in FIG. 1). In some embodiments, the display 125 can also display images or video captured by the imaging device or camera 112.

In some embodiments, a cursor is associated with the display 125 and can be controlled through the I/O interface 175 to highlight certain portions of the display 125. For example, a mouse may be connected through the I/O interface 175 to allow a user to select or delineate certain objects in the live preview image represented on the display 125 that contain private information. In other embodiments, the NED system 100 can be programmed to recognize hand gestures of a user that can be used to select objects within an image. During the learning phase, the NED system 100 learns what constitutes sensitive or private information from user input. Thereafter, the NED system 100 can automatically blur or block out the sensitive contents from displaying on the display 125, either during a live preview image or in an image or video captured by the depth camera assembly 155.

The optical assembly 130 magnifies image light received from the display 125, corrects optical errors associated with the image light, and presents the corrected image light to a user of the NED 105. The optical assembly 130 includes a plurality of optical elements. For example, one or more of the following optical elements may be included in the optical assembly 130: an aperture, a Fresnel lens, a convex lens, a concave lens, a filter, a reflecting surface, or any other suitable optical element that deflects, reflects, refracts, and/or in some way alters image light. Moreover, the optical assembly 130 may include combinations of different optical elements. In some embodiments, one or more of the optical elements in the optical assembly 130 may have one or more coatings, such as partially reflective or antireflective coatings.

In some embodiments, the optical assembly 130 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 125 is pre-distorted, and the optical assembly 130 corrects the distortion as image light from the display 125 passes through various optical elements of the optical assembly 130. In some embodiments, optical elements of the optical assembly 130 are integrated into the display 125 as a projection assembly that includes at least one waveguide coupled with one or more optical elements.

The IMU 140 is an electronic device that generates data indicating a position of the NED 105 based on measurement signals received from one or more of the position sensors 135 and from depth information received from the DCA 155. In some embodiments of the NED 105, the IMU 140 may be a dedicated hardware component. In other embodiments, the IMU 140 may be a software component implemented in one or more processors.

In operation, a position sensor 135 generates one or more measurement signals in response to a motion of the NED 105. Examples of position sensors 135 include: one or more accelerometers, one or more gyroscopes, one or more magnetometers, one or more altimeters, one or more inclinometers, and/or various types of sensors for motion detection, drift detection, and/or error detection. The position sensors 135 may be located external to the IMU 140, internal to the IMU 140, or some combination thereof.

Based on the one or more measurement signals from one or more position sensors 135, the IMU 140 generates data indicating an estimated current position of the NED 105 relative to an initial position of the NED 105. For example, the position sensors 135 include multiple accelerometers to measure translational motion (forward/back, up/down, left/right) and multiple gyroscopes to measure rotational motion (e.g., pitch, yaw, and roll). In some embodiments, the IMU 140 rapidly samples the measurement signals and calculates the estimated current position of the NED 105 from the sampled data. For example, the IMU 140 integrates the measurement signals received from the accelerometers over time to estimate a velocity vector and integrates the velocity vector over time to determine an estimated current position of a reference point on the NED 105. Alternatively, the IMU 140 provides the sampled measurement signals to the console 170, which analyzes the sample data to determine one or more measurement errors. The console 170 may further transmit one or more of control signals and/or measurement errors to the IMU 140 to configure the IMU 140 to correct and/or reduce one or more measurement errors (e.g., drift errors). The reference point is a point that may be used to describe the position of the NED 105. The reference point may generally be defined as a point in space or a position related to a position and/or orientation of the NED 105.

In various embodiments, the IMU 140 receives one or more parameters from the console 170. The one or more parameters are used to maintain tracking of the NED 105. Based on a received parameter, the IMU 140 may adjust one or more IMU parameters (e.g., a sample rate). In some embodiments, certain parameters cause the IMU 140 to update an initial position of the reference point so that it corresponds to a next position of the reference point. Updating the initial position of the reference point as the next calibrated position of the reference point helps reduce drift errors in detecting a current position estimate of the IMU 140.

In various embodiments, the eye tracking system 145 is integrated into the NED 105. The eye-tracking system 145 may comprise one or more illumination sources (e.g., infrared illumination source, visible light illumination source) and one or more imaging devices (e.g., one or more cameras). In operation, the eye tracking system 145 generates and analyzes tracking data related to a user's eyes as the user wears the NED 105. In various embodiments, the eye tracking system 145 estimates the angular orientation of the user's eye. The orientation of the eye corresponds to the direction of the user's gaze within the NED 105. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and +4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 145 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 105 on a user's head. The eye tracking system 145 may also detect the torsion of the eye, i.e., rotation of the eye about the pupillary axis. The eye tracking system 145 may use the detected torsion of the eye to estimate the orientation of the foveal axis from the pupillary axis. The eye tracking system 145 may also track a change in the shape of the eye, which may be approximated as a skew or scaling linear transform or a twisting distortion (e.g., due to torsional deformation). The eye tracking system 145 may estimate the foveal axis based on some combination of the angular orientation of the pupillary axis, the translation of the eye, the torsion of the eye, and the current shape of the eye.

As the orientation may be determined for both eyes of the user, the eye tracking system 145 is able to determine where the user is looking. The NED 105 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and through the point halfway between the pupils of the user's eyes.

In some embodiments, the varifocal module 150 is integrated into the NED 105. The varifocal module 150 may be communicatively coupled to the eye tracking system 145 in order to enable the varifocal module 150 to receive eye tracking information from the eye tracking system 145. The varifocal module 150 may further modify the focus of image light emitted from the display 125 based on the eye tracking information received from the eye tracking system 145. Accordingly, the varifocal module 150 can reduce vergence-accommodation conflict that may be produced as the user's eyes resolve the image light. In various embodiments, the varifocal module 150 can be interfaced (e.g., either mechanically or electrically) with at least one optical element of the optical assembly 130.

In operation, the varifocal module 150 may adjust the position and/or orientation of one or more optical elements in the optical assembly 130 in order to adjust the focus of image light propagating through the optical assembly 130. In various embodiments, the varifocal module 150 may use eye tracking information obtained from the eye tracking system 145 to determine how to adjust one or more optical elements in the optical assembly 130. In some embodiments, the varifocal module 150 may perform foveated rendering of the image light based on the eye tracking information obtained from the eye tracking system 145 in order to adjust the resolution of the image light emitted by the display 125. In this case, the varifocal module 150 configures the display 125 to display a high pixel density in a foveal region of the user's eye-gaze and a low pixel density in other regions of the user's eye-gaze.

In some embodiments, a camera 112 is integrated into the NED 105. The camera 112 can either be a part of the DCA 155 or it can be a separate imaging device. In some embodiments, the display 125 can be communicatively coupled to the camera 112 so that the user is able to view a live preview image from the camera and/or images and videos captured using the camera on the display 125. In some embodiments, the camera 112 uses a voice coil motor (VCM) actuator (e.g., to control camera autofocus).

In some embodiments, an aperture actuator 190 is integrated into the NED 105 and controls an aperture of an imaging device or camera 112 included in the NED system 100. An aperture actuator is a device that is used to control the size of the aperture, or opening, in an optical system, such as a camera or other imaging device. The aperture controls the amount of light that enters the system and affects the depth of field and overall exposure of the image. The aperture actuator can be a mechanical or electrical device, and is used to adjust the aperture to the desired size. Aperture size can affect the depth of field in an image, which is the distance between the nearest and farthest objects that are in focus. A smaller aperture will result in a greater depth of field, while a larger aperture will result in a shallower depth of field. The aperture actuator can adjust the depth of field to capture the relevant objects (e.g., in the z-direction) while other objects are blurred.

The aperture size can also influence the field of view. Aperture is one of the key elements that affect depth of field, which refers to the range of distances in a photograph that appear in focus. A larger aperture (smaller f-stop number) will result in a shallower depth of field, where only a small portion of the scene is in focus, while a smaller aperture (larger f-stop number) will result in a greater depth of field, where more of the scene is in focus. When taking a photograph, the aperture size will affect how much of the scene is in focus, this also means that it will affect the field of view. For example, if a user of an imaging device or camera takes a photo with a large aperture, it will have a shallow depth of field and only a small part of the scene will be in focus, which will make the field of view appear smaller. On the other hand, if a user takes a photo with a small aperture, it will have a greater depth of field and more of the scene will be in focus, which will make the field of view appear larger. So depending on the desired effect, aperture size can be adjusted to control the field of view.

In some embodiments, an autofocus actuator 110 is integrated into the NED 105 and controls the movements of a lens element associated with the camera 112 in order to achieve a more accurate focus on a subject. It is used in imaging devices and cameras with autofocus capabilities. The actuator can be a small motor actuator that moves the lens element back and forth, adjusting the distance between the lens and the camera's sensor. The actuator can also be a tunable lens type actuator that deforms a lens, which in turn changes a focus of the lens. This allows the camera to quickly and accurately focus on a subject, even when it is in motion. In some embodiments, the autofocus actuator is controlled by the camera's firmware, which uses information from the camera's autofocus system, such as contrast and phase detection, to determine the correct focus position. The camera's autofocus system will analyze the scene and determine the distance to the subject, and then the autofocus actuator will adjust the lens to the correct position, allowing the photographer to capture a clear and sharp image. The autofocus actuator can also be responsible for moving the lens element to the correct position when switching from one subject to another, or when the photographer changes the focus point.

The autofocus actuator itself does not directly influence the field of view or depth of field of a photograph, but the way it is used can have an effect on these elements. Field of view is typically determined by the focal length of the lens and the size of the camera's sensor. Autofocus allows the photographer to quickly and accurately focus on a subject within the field of view. While the autofocus actuator may not have a significant effect on the field of view, it can have a discernible effect in some cases. Depth of field, on the other hand, is affected by aperture size, focal length, and the distance between the subject and the camera. Autofocus can affect depth of field by allowing the photographer to quickly and accurately focus on a specific part of the scene, which can be useful for controlling the range of distances that appear in focus. For example, the autofocus actuator can adjust the focus to a subject that is determines to be the main subject in the frame, which can cause the background to be out of focus, resulting in a shallow depth of field. In some embodiments, a tunable autofocus lens is used.

In some embodiments, a sensor actuator 111 is integrated into the NED 105. The sensor actuator 111 is able to move the position of a sensor associated with the camera 112. In some embodiments, the privacy engine 185 can change the position of the sensor in order to selectively crop out portions of an image or video captured by the camera 112. In some embodiments, the functionality of the sensor actuator 111 can be integrated with the OIS actuator 195.

In some embodiments, an optical image stabilization (OIS) actuator 195 is integrated into the NED 105. A typical OIS actuator is a device used to reduce the effects of camera shake and motion blur in photographs. A general OIS actuator works by physically moving the lens elements to counteract any movement of the camera. It uses sensors in the camera to detect any movement, and then uses a motor to move the lens elements in the opposite direction. This compensates for the camera movement, keeping the image projected onto the sensor stable, and allowing for a sharper image.

In generalized cameras or imaging devices, the OIS actuator can be used in combination with other image stabilization systems such as electronic image stabilization (EIS), which uses software to reduce camera shake and motion blur. OIS is typically more effective than EIS in reducing the effects of camera shake and motion blur, because it is able to directly counteract the movement of the camera, rather than relying on software algorithms to remove the blur.

The OIS actuator 195 in NED 105 operates differently from an OIS actuator in a generalized imaging device. The OIS actuator 195 can operate in a destabilization mode, which is the opposite of a stabilizing function performed by a generalized OIS actuator. In destabilization mode, the OIS actuator operates to destabilizean image. Introducing destabilization into an image results in certain parts of the image being blurred out. Accordingly, the OIS actuator 195 can be used in combination with other hardware-based actuators (e.g., the autofocus, sensor and aperture actuators) to filter out and remove certain sensitive contents of an image or a video. As noted above, typically the OIS actuator 195 controls the movement of the lens of the camera. In some embodiments, however, the functionality of the OIS actuator 195 and the sensor actuator 111 can be combined, where the OIS actuator controls both the lens and sensor movement in the camera.

In some embodiments, where the OIS actuator 195 and the sensor actuator 111 are combined in functionality, the OIs actuator can crop images by shifting the sensor laterally and also create blurriness in an image by moving the sensor or lens (thereby creating destabilization) during an exposure. In some embodiments, a Micro Electro-Mechanical System (MEMS) sensor-shift OIS can combine the functionality of an OIS actuator and a sensor actuator.

In some embodiments, an LED indicator 176 is integrated into the NED 105. The LED indicator 176 typically lights on to indicate that the camera within the NED 105 is recording. In some embodiments, the imaging device or camera 112 in the NED 105 can operate in two modes, for example, a normal mode and a privacy mode. The camera can, for example, be part of the depth camera assembly 155 or it can be an additional camera or imaging device 112 integrated into the NED 105 as noted above. In the normal mode, the camera works like a typical camera that captures and records all the scenes and objects in its field of view. In a privacy mode, the camera only captures objects of interest and blurs or blocks out other objects. In some embodiments, the color of the LED indicator 176 changes depending on the mode in which it is operation. For example, the LED indicator may flash a red color in privacy mode and a green color in normal mode.

The I/O interface 175 facilitates the transfer of action requests from a user to the console 170. In addition, the I/O interface 175 facilitates the transfer of device feedback from the console 170 to the user. An action request is a request to perform a particular action. For example, an action request may be an instruction to start or end capture of image or video data or an instruction to perform a particular action within an application, such as pausing video playback, increasing or decreasing the volume of audio playback, initiating and pausing transcription of the audio, switching the camera between privacy mode and normal mode, and so forth. In various embodiments, the I/O interface 175 may include one or more input devices. Example input devices include: a keyboard, a mouse, a game controller, a joystick, and/or any other suitable device for receiving action requests and communicating the action requests to the console 170. In some embodiments, the I/O interface 175 includes an IMU 140 that captures calibration data indicating an estimated current position of the I/O interface 175 relative to an initial position of the I/O interface 175.

In operation, the I/O interface 175 receives action requests from the user and transmits those action requests to the console 170. Responsive to receiving the action request, the console 170 performs a corresponding action. For example, responsive to receiving an action request, console 170 may configure I/O interface 175 to emit haptic feedback onto an arm of the user. For example, console 170 may configure I/O interface 175 to deliver haptic feedback to a user when an action request is received. Additionally or alternatively, the console 170 may configure the I/O interface 175 to generate haptic feedback when the console 170 performs an action, responsive to receiving an action request.

The console 170 provides content to the NED 105 for processing in accordance with information received from one or more of: the DCA 155, the eye tracking system 145, one or more other components of the NED 105, and the I/O interface 175. In the embodiment shown in FIG. 1, the console 170 includes an application store 160 and an engine 165. In the embodiment shown in FIG. 1, the engine 165 comprises a privacy engine 185. Various embodiments include a privacy engine configured to intelligently access and actuate one or more different hardware-based mechanisms for cropping out, blurring or blocking private content in a live preview image generated for the camera and from media recorded by the camera. The privacy engine 165, in some embodiments, can communicate with and control the aperture actuator 190, the sensor actuator 111, the autofocus actuator 110 and the OIS actuator 195 to remove sensitive content from media recorded by the camera and from the live preview image generated by the camera.

In some embodiments, the privacy engine 185 receives user-based input from I/O interface 175 regarding a plurality of objects to be identified and removed from a live preview image or media captured by the camera. For example, the privacy engine 185 can receive user input from exemplary input devices such as a keyboard, a mouse, a game controller, a joystick, and/or other types of input devices to identify one or more objects that contain private or sensitive information. In some embodiments, a user can also use hand gestures to indicate parts of the display containing private information. By way of further example, a user can provide a predefined list containing objects of interest or sensitive objects using a keyboard. Also, a user can use the input devices such as a mouse to draw a box around or clearly delineate sensitive objects in a live preview image shown on the display 125.

Additionally, information regarding what constitutes sensitive or private content can be predefined by the NED or camera manufacturer and pre-programmed in the device. For example, a list of sensitive content can be obtained based on studies or surveys from users, and may include information regarding user's last names, birthdays, social security numbers, etc. When sensitive information that is pre-programmed in device memory is identified on a live preview screen of a camera, the content is automatically recognized and filtered out by the privacy engine 185, where during the live preview mode a display screen on the camera acts as a viewfinder and displays a live preview of a scene at which the camera is currently pointing.

In some embodiments, the console 170 may have additional, fewer, or different modules and/or components than those described in conjunction with FIG. 1. Similarly, the functions further described below may be distributed among components of the console 170 in a different manner than described in conjunction with FIG. 1.

The application store 160 stores one or more applications for execution by the console 170. An application is a group of instructions that, when executed by a processor, performs a particular set of functions, such as generating content for presentation to the user. For example, an application may generate content in response to receiving inputs from a user (e.g., via movement of the NED 105 as the user moves his/her head, via the I/O interface 175, etc.). Examples of applications include: gaming applications, conferencing applications, video playback applications, or other suitable applications.

In some embodiments, the engine 165 generates a three-dimensional mapping of the area surrounding the NED 105 (i.e., the "local area") based on information received from the NED 105. In some embodiments, the engine 165 determines depth information for the three-dimensional mapping of the local area based on depth data received from the NED 105. In various embodiments, the engine 165 uses depth data received from the NED 105 to update a model of the local area and to generate and/or modify media content based in part on the updated model of the local area.

The engine 165 also executes applications within the NED system 100 and receives position information, acceleration information, velocity information, predicted future positions, eye-gaze information, or some combination thereof, of the NED 105. Based on the received information, the engine 165 determines various forms of media content to transmit to the NED 105 for presentation to the user. For example, if the received information indicates that the user has looked to the left, the engine 165 generates media content for the NED 105 that mirrors the user's movement in a virtual environment or in an environment augmenting the local area with additional media content. Accordingly, the engine 165 may generate and/or modify media content (e.g., visual and/or audio content) for presentation to the user. The engine 165 may further transmit the media content to the NED 105. Additionally, in response to receiving an action request from the I/O interface 175, the engine 165 may perform an action within an application executing on the console 170. The engine 165 may further provide feedback when the action is performed. For example, the engine 165 may configure the NED 105 to generate visual and/or audio feedback and/or the I/O interface 175 to generate haptic feedback to the user.

In some embodiments, based on the eye tracking information (e.g., orientation of the user's eye) received from the eye tracking system 145, the engine 165 determines a resolution of the media content provided to the NED 105 for presentation to the user on the display 125. The engine 165 may adjust a resolution of the visual content provided to the NED 105 by configuring the display 125 to perform foveated rendering of the visual content, based at least in part on a direction of the user's gaze received from the eye tracking system 145. The engine 165 provides the content to the NED 105 having a high resolution on the display 125 in a foveal region of the user's gaze and a low resolution in other regions, thereby reducing the power consumption of the NED 105. In addition, using foveated rendering reduces a number of computing cycles used in rendering visual content without compromising the quality of the user's visual experience. In some embodiments, the engine 165 can further use the eye tracking information to adjust a focus of the image light emitted from the display 125 in order to reduce vergence-accommodation conflicts.

Figure 2A:
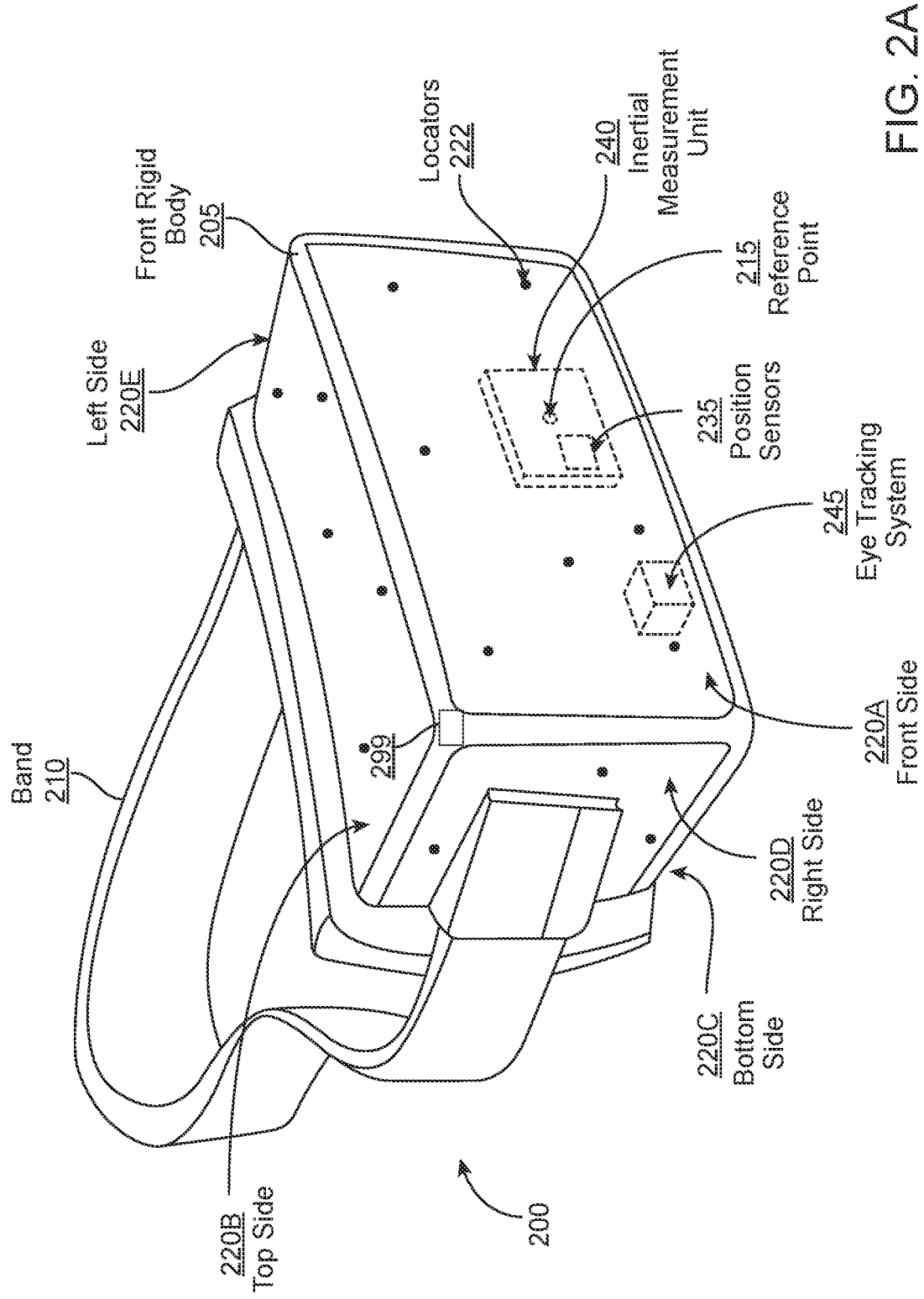
FIG. 2A is a diagram of an NED, according to various embodiments.

FIG. 2A is a diagram of an NED 200, according to various embodiments. In various embodiments, NED 200 presents media to a user. The media may include visual, auditory, and haptic content. In some embodiments, NED 200 provides artificial reality (e.g., virtual reality) content by providing a real-world environment and/or computer-generated content. In some embodiments, the computer-generated content may include visual, auditory, and haptic information.

Persons of ordinary skill in the art will understand that NED 200 may comprise a see-through NED. A see-through NED leave the user's view of the real world open and create either a transparent image or a small opaque image that blocks only a small portion of the user's peripheral vision. The see-through category typically comprises augmented reality headsets and smart glasses. Augmented reality headsets typically have a 20 to 60 degree field of view and overlay information and graphics on top of the user's view of the real world. Smart glasses typically have a smaller field of view and a display at which the user glances periodically rather than looking through the display continuously.

The NED 200 is an embodiment of the NED 105 and includes a front rigid body 205 and a band 210. The front rigid body 205 includes an electronic display element of the electronic display 125 (not shown in FIG. 2A), the optics assembly 130 (not shown in FIG. 2A), the IMU 240, the one or more position sensors 235, the eye tracking system 245, the LED indicator 299, and the locators 222. In the embodiment shown by FIG. 2A, the position sensors 235 are located within the IMU 240, and neither the IMU 240 nor the position sensors 235 are visible to the user. The IMU 240, the position sensors 235, the eye tracking system 245, the locators 222, and the LED indicator 299 perform substantially the same function as the respective elements IMU 140, position sensors 135, the eye tracking system 145, the locators 120 and the LED indicator 176 in FIG. 1.

The locators 222 are located in fixed positions on the front rigid body 205 relative to one another and relative to a reference point 215. In the example of FIG. 2A, the reference point 215 is located at the center of the IMU 140. Each of the locators 222 emits light that is detectable by the imaging device in the DCA 155. The locators 222, or portions of the locators 222, are located on a front side 220A, a top side 220B, a bottom side 220C, a right side 220D, and a left side 220E of the front rigid body 205 in the example of FIG. 2A.

The NED 200 includes the eye tracking system 245. As discussed above, the eye tracking system 245 may include a structured light generator that projects an interferometric structured light pattern onto the user's eye and a camera to detect the illuminated portion of the eye. The structured light generator and the camera may be located off the axis of the user's gaze. In various embodiments, the eye tracking system 245 may include, additionally or alternatively, one or more time-of-flight sensors and/or one or more stereo depth sensors. In FIG. 2A, the eye tracking system 245 is located below the axis of the user's gaze, although the eye tracking system 245 can alternately be placed elsewhere. Also, in some embodiments, there is at least one eye tracking unit for the left eye of the user and at least one tracking unit for the right eye of the user.

In various embodiments, the eye tracking system 245 includes one or more cameras on the inside of the NED 200. The camera(s) of the eye tracking system 245 may be directed inwards, toward one or both eyes of the user while the user is wearing the NED 200, so that the camera(s) may image the eye(s) and eye region(s) of the user wearing the NED 200. The camera(s) may be located off the axis of the user's gaze. In some embodiments, the eye tracking system 245 includes separate cameras for the left eye and the right eye (e.g., one or more cameras directed toward the left eye of the user and, separately, one or more cameras directed toward the right eye of the user).

Figure 2B:
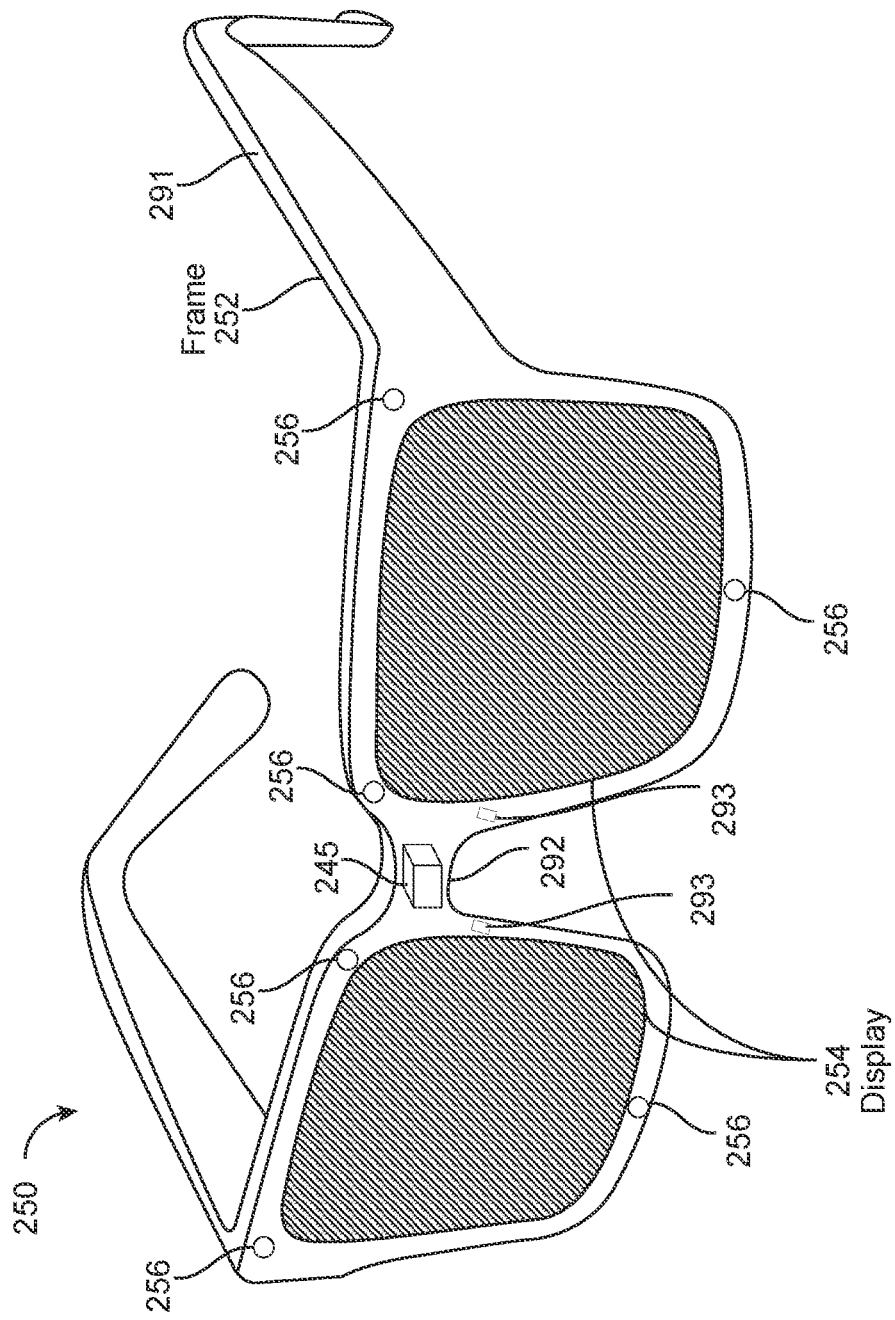
FIG. 2B is a diagram of an NED, according to various embodiments. In various embodiments, NED presents media to a user.

FIG. 2B is a diagram of an NED 250, according to various embodiments. In various embodiments, NED 250 presents media to a user. The media may include visual, auditory, and haptic content. In some embodiments, NED 250 provides artificial reality (e.g., augmented reality) content by providing a real-world environment and/or computer-generated content. In some embodiments, the computer-generated content may include visual, auditory, and haptic information. The NED 250 is an embodiment of the NED 105. In one embodiment, the NED 250 includes see-through smart glasses. In one embodiment, the NED 250 is configured with a camera or imaging device and is able to present a live preview image on a display 254 of the NED 250 and also record images and video.

NED 250 includes frame 252 and the display 254. In various embodiments, the NED 250 may include one or more additional elements. Display 254 may be positioned at different locations on the NED 250 than the locations illustrated in FIG. 2B. Display 254 is configured to provide content to the user, including audiovisual content. In some embodiments, one or more displays 254 may be located within frame 252. As noted above, in some embodiments, a user may be able to use an input device such as a mouse connected using an I/O interface (e.g., I/O interface 175) to indicate content on the display 254 that should be blurred out or blocked.

NED 250 further includes eye tracking system 245 and one or more corresponding modules 256. The modules 256 may include emitters (e.g., light emitters) and/or sensors (e.g., image sensors, cameras). In various embodiments, the modules 256 are arranged at various positions along the inner surface of the frame 252, so that the modules 256 are facing the eyes of a user wearing the NED 250. For example, the modules 256 could include emitters that emit structured light patterns onto the eyes and image sensors to capture images of the structured light pattern on the eyes. As another example, the modules 256 could include multiple time-offlight sensors for directing light at the eyes and measuring the time of travel of the light at each pixel of the sensors. As a further example, the modules 256 could include multiple stereo depth sensors for capturing images of the eyes from different vantage points. In various embodiments, the modules 256 also include image sensors for capturing 2D images of the eyes.

In some embodiments, the LED indicator(s) 293 may be disposed on the nose pad 292 of the NED 250 or in any suitable position where a third party can clearly discern whether the camera integrated into the NED 250 is operating in a privacy mode. LED indicator 293 performs substantially the same function as the LED indicator 176 shown in FIG. 1.

Privacy Engine

Figure 3:
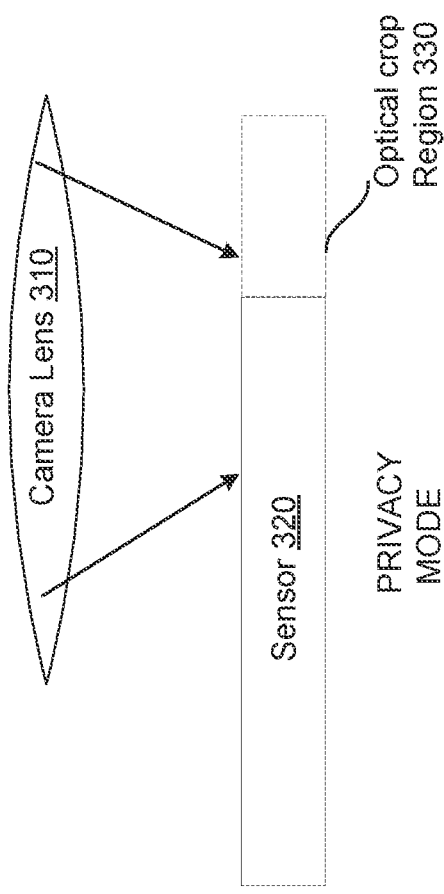
FIG. 3 illustrates a technique for cropping images or videos in a camera by changing a sensor position using the sensor actuator, according to various embodiments.
Figure 3:
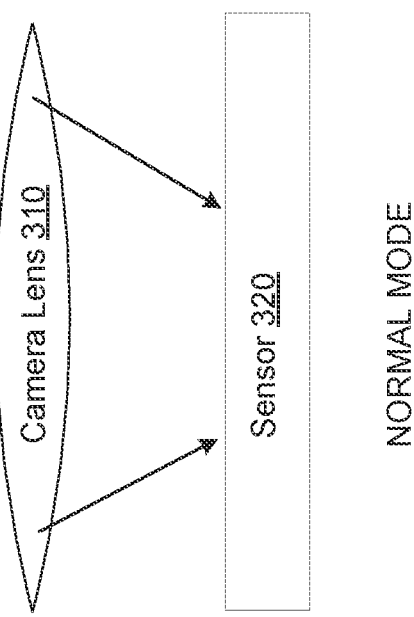

FIG. 3 illustrates a technique for cropping images or videos in a camera by changing a sensor position using the sensor actuator, according to various embodiments. As discussed above, the camera (e.g., camera 112) can operate either in normal mode or privacy mode. In normal mode, for example, the camera lens 310 and sensor 320 can be aligned so that an image or video can be captured normally. In privacy mode, the privacy engine 185 can detect sensitive content in a part of the live preview image, where, as explained above, the live preview image is generated for a user to preview an image in real-time prior to capturing it in the form of either an image or video. In response, the privacy engine 185 transmits one or more instructions to the sensor actuator 111 to displace or translate the sensor 320 in a way such that a part of the image or video (e.g., optical crop region 330 shown in FIG. 3) is cropped out. For example, the sensor 320 can be displaced in an x-y direction in order to selectively crop out media captured by the camera.

Figure 4:
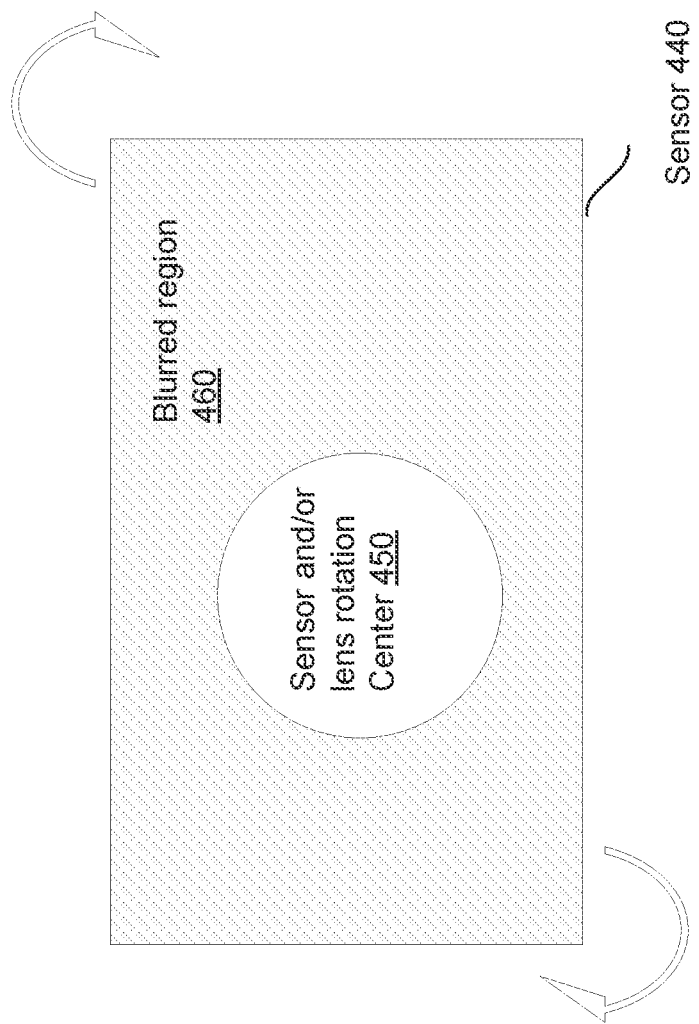
FIG. 4 illustrates the manner in which an OIS actuator blurs out certain sensitive content from an image, according to various embodiments.

FIG. 4 illustrates the manner in which an OIS actuator 195 blurs out certain sensitive content from an image, according to various embodiments. As noted above, an OIS actuator 195 shown in FIG. 1 can operate in a destabilization mode (which is the opposite of a generalized OIS actuator). The privacy engine 185 can, for example, detect private contents in an image and control an actuation of an OIS actuator to destabilize the image. The destabilization and resultant blurred region 460 can be created as a result of the OIS actuator moving the camera lens element to cause physical distortion in the image or shifting the camera sensor or a combination of both. Note that an OIS actuator can usually control a movement of the lens unit, and adjust the position of the lens element to create distortion. The greater the movement in the lens that is created by the OIS actuator the higher the distortion and blurriness in the blurred region 460. In some embodiments, the OIS actuator 195 can also control the camera sensor position (e.g., the position of sensor 440 in FIG. 4). Shifting the position of the sensor can also be used to create blurriness in an image. While shifting the sensor laterally as shown in FIG. 3 results in a cropping of the image, the sensor 440 shown in FIG. 4 can also be moved in an angular direction to create blurriness in region 460 that is around the sensor rotation center 450. As noted previously, the sensitive content can be blurred by operating the OIS in a destabilization mode (to create destabilization) where the OIS actuator moves the sensor or lens or both during a single exposure.

As noted previously, there can be two types of OIS actuators. Some types of OIS actuators can move the camera lens while other types of OIS actuators can create minor shifts in sensor positioning (sensor shift OIS actuators). In some embodiments, OIS actuators may move both the lens of the camera and a sensor positioning. In some embodiments, simply rotating the lens is not enough to create a substantial distortion to the image. To create a larger distortion, in some embodiments, the sensor is rotated or translated directly along with a translational movement of the lens or a combination of both.

In some embodiments, the sensor actuator 111 can be used in addition to the OIS actuator 195 to create the requisite amount of distortion required. As noted previously, the sensor actuator 111 is typically able to create larger shifts in the sensor position as compared to the sensor shifting capabilities of an OIS actuator 195. The sensor actuator 111 can move the sensor within a larger range than a sensor shifting mechanism of an OIS actuator 195. Accordingly, in some embodiments, where a high degree of destabilization and blur is required, both the sensor actuator 111 and the OIS actuator 195 can be deployed together.

Figure 5:
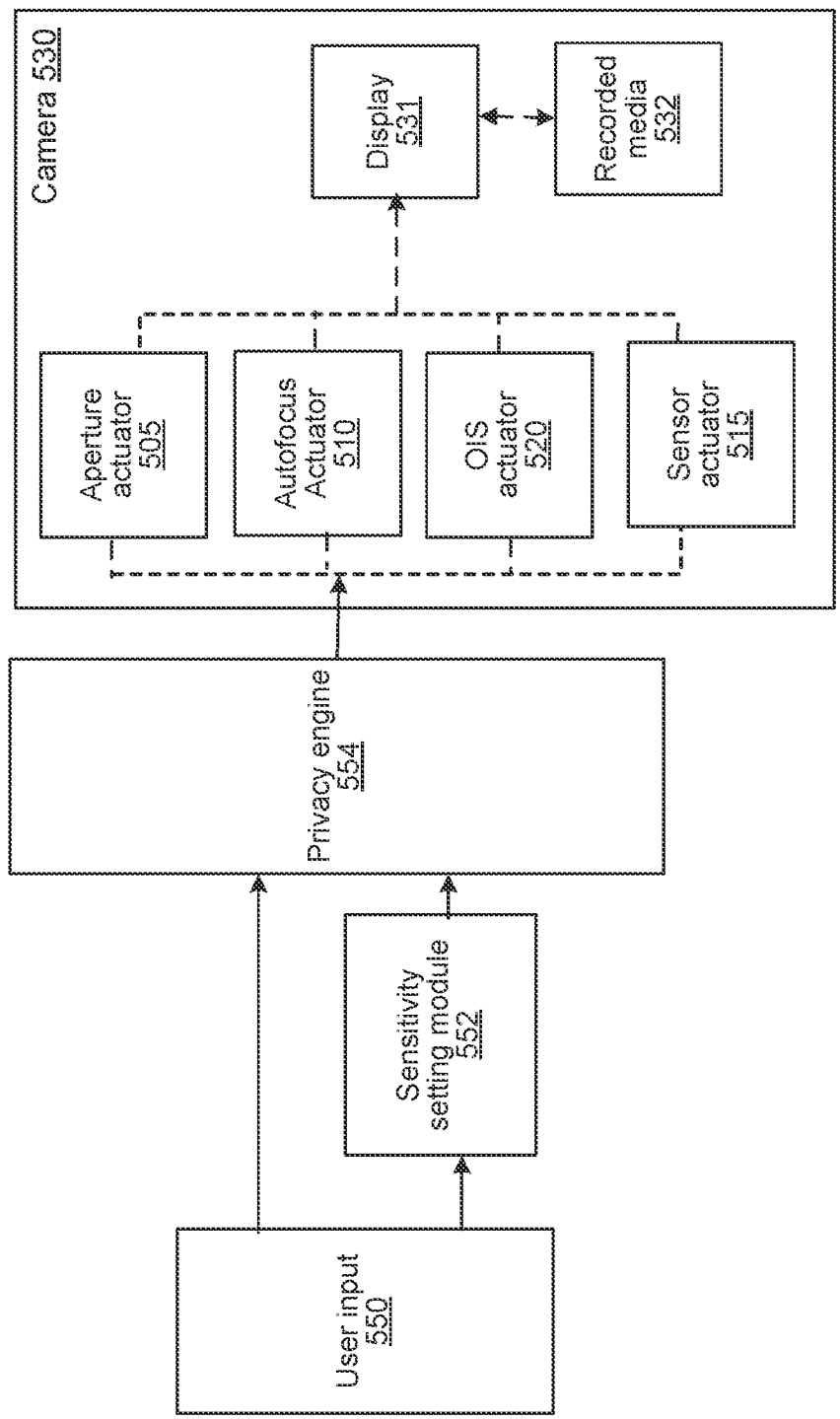
FIG. 5 illustrates a technique for removing private content from a camera display, according to various embodiments.

FIG. 5 illustrates a technique for removing private content from a camera display, according to various embodiments. In some embodiments, user input 550 into a privacy engine 554 determines what constitutes private content. For example, while a live preview image is being displayed on display 531 of the camera 530, a user can identify various parts of the display that contain private information. For example, the privacy engine 185 can receive the user input 550 from exemplary input devices such as a keyboard, a mouse, a game controller, a joystick, and/or other types of input devices to identify one or more objects being displayed on the display 531 that contain private or sensitive information. In some embodiments, a user can also use hand gestures to indicate parts of the display 531 containing private information. By way of further example, a user can provide a predefined list containing objects of interest or sensitive objects using a keyboard. Also, a user can use the input devices such as a mouse to draw a box around or clearly delineate sensitive objects in a live preview image shown on the display 125 or when a recording starts. In some embodiments, content that constitutes sensitive information can be factory programmed into the camera.

In some embodiments, the camera 530 uses a machine learning model (not shown in FIG. 5) that includes a pre-trained model that is used determine whether content on a camera display 531 is private. For example, the machine learning model can be trained using images of private content. Or, for example, the machine learning model can determine what is private content based on the user's behavior and preferences (e.g., a user can indicate content they prefer to exclude over time). The machine learning model may include one or more recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs, and/or other types of artificial neural networks or components of artificial neural networks. The machine learning model may also, or instead, include a regression model, support vector machine, decision tree, random forest, gradient-boosted tree, naïve Bayes classifier, Bayesian network, Hidden Markov model (HMM), hierarchical model, ensemble model, clustering technique, and/or another type of machine learning model that does not utilize artificial neural network components.

As noted above, the privacy engine 554, based on knowledge regarding what constitutes private contents, can control one or more of the aperture actuator 505, autofocus actuator 510, OIS actuator 520 and sensor actuator 515 to block out private contents in either a live preview image displayed on the display 531 or on recorded media 532 (e.g., in an image or video captured by the camera 530). Note that as stated above, the OIS actuator 520 and the sensor actuator 515 can be part of the same hardware.

In some embodiments, a machine learning model can be trained to determine how to optimally balance between the image modifications created by the aperture actuator 505, autofocus actuator 510, OIS actuator 520 and sensor actuator 515 to block or blur out the undesired content. For example, if the private content is predominantly on one side of the image (e.g., the right hand side), the model may determine that a translation of the sensor caused by the sensor actuator 515 and a resultant cropping of the image is a better approach to removing the contents as compared to changing a depth of field using the aperture actuator 505. It should be noted that to blur out certain types of content may require the model to use more than one or even all the different types of actuators. Similar to the model that learns what constitutes private content, the model that can be trained to determine an ideal combination of the actuators to utilize can also include one or more recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs, and/or other types of artificial neural networks or components of artificial neural networks. The machine learning model may also, or instead, include a regression model, support vector machine, decision tree, random forest, gradient-boosted tree, naïve Bayes classifier, Bayesian network, Hidden Markov model (HMM), hierarchical model, ensemble model, clustering technique, and/or another type of machine learning model that does not utilize artificial neural network components.

In some embodiments, the model which balances the effects between the different actuators can be trained based on images and pixel data generated with different positional settings of the various actuators. The training enables the model to learn the extent and type of obscuring performed by each of the various actuators. For example, images can be created with the aperture actuator 505 at lower f-stop and higher f-stop settings. Similarly, images can be created with different parts of the image in focus using the autofocus actuator 510. Further, images can be created that are cropped on various sides based on sensor shifts caused by the sensor actuator 515. Similarly, images can be created with blurring caused by various states of destabilization caused by lens and sensor movement initiated by the OIS actuator. Images can also be created that combine the effects of the various actuators. The images can then be used to train the model. In this way, the model can use the image and pixel data from various images to learn what the best combination of blurring or cropping caused by the various actuators is in order to remove private content from an image or a video.

In some embodiments, a sensitivity setting module 552 can be used in combination with the user input 550 to tune the effects of the various actuators. For example, a user may not want to use the autofocus actuator 510 in order to filter private content and, accordingly, the sensitivity setting module 552 can provide the user an option to switch off the effects of the autofocus actuator when modifying the images. Also, the sensitivity setting module 552 can also be used to allow the user to prioritize certain types of filtering over others. For example, the user may have a preference for cropping out content from images over blurring. The sensitivity setting module 552 allows the user to control a type of filtering also.

Figure 6:
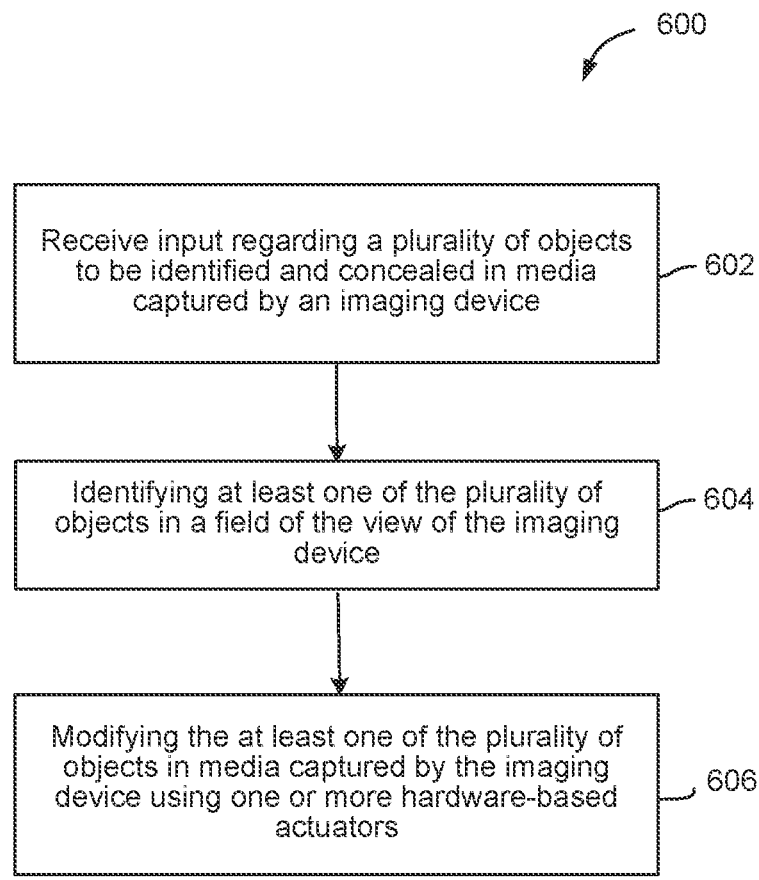
FIG. 6 is a flow diagram of method steps for hardware-based protection of private contents in an imaging device, according to various embodiments.

FIG. 6 is a flow diagram of method steps for hardware-based protection of private contents in an imaging device, according to various embodiments. Although the method steps are described with reference to the systems of FIGS. 1-5, persons skilled in the art will understand that any system may be configured to implement the method steps, in any order, in other embodiments.

As shown, a method 600 begins at step 602, where input is received at a privacy engine 185 regarding a plurality of objects to be identified and concealed in media captured by an imaging device (e.g., a camera). In some embodiments, the input can be user-based input. In other embodiments, the input can be from a machine learning model that is trained on cues gathered from a user (e.g., cues pertaining to a user's preferences).

At step 604, the privacy engine 185 identifies at least one of the plurality of objects in a field of view of the imaging device. For example, the privacy engine can identify an object during a live preview mode of the imaging device.

At step 606, the privacy engine 185 can modify at least one of the plurality of objects using one or more hardware-based actuators, where modifying at least one of the plurality of objects causes the one of the plurality of objects to be concealed. The actuators can include an aperture actuator 505, autofocus actuator 510, OIS actuator 520 and sensor actuator 515. The actuators can conceal private contents in either a live preview image displayed on the display 531 or on recorded media 532 (e.g., in an image or video captured by the camera 530) using one of several techniques that depend on the type of actuator used. For example, the autofocus actuator can conceal one of the objects by blurring out part of the image, the sensor actuator can conceal an object by cropping it out of the image, and an OIS actuator can conceal an object by either destabilizing an image to create blur or by actuating the sensor to crop the object out of the image.

In sum, a privacy engine is configured to intelligently access one or more different hardware-based mechanisms for cropping out, blurring or blocking private content in a live preview image generated for the camera and from media recorded by the camera. The technique incudes receiving input regarding a plurality of objects to be identified and removed from a live preview image or media captured by the camera. The technique further includes identifying at least one of the plurality of objects during a live preview mode of the camera, wherein during the live preview mode a display screen of the camera acts as a viewfinder and displays a live preview of a scene at which the camera is currently pointing. The technique also includes obscuring the at least one of the plurality of objects from the live preview mode or media (e.g., images or videos) captured by the camera using a hardware actuator. One of several different types of hardware actuators may be utilized, including but not limited to: a) an autofocus actuator; b) an aperture actuator; c) a sensor actuator and d) an optical image stabilization (OIS) actuator.

At least one advantage of the disclosed techniques is that it provides a more efficient and robust mechanism for filtering out and removing content from a live preview mode of the camera or any media captured by the camera than software-based mechanisms. Because the private content is removed using hardware-based mechanisms, no additional processing time following the capture of an image or video is necessary to remove private content. Unlike software-based mechanisms that can be error prone and dependent on the quality of software algorithms, the hardware-based mechanisms remove content from media captured by the camera in a way that precludes any ability to recover private or sensitive information. Accordingly, an operator of the camera and a subject being captured can both be assured that none of their private information is being exposed and further that none of the information can be recovered. For cameras integrated into wearable devices, such as smart glasses, using hardware-based mechanisms that do not allow private information to be recovered, leads to an additional level of trust in such devices for both the users of the wearable devices and the general public. Additionally, disclosed techniques allows third parties to easily verify whether information has been removed from recorded media.

Any and all combinations of any of the claim elements recited in any of the claims and/or any elements described in this application, in any fashion, fall within the contemplated scope of the present embodiments and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

1. According to some embodiments a computer-implemented method comprises receiving input regarding a plurality of objects to be concealed in media captured by an imaging device; identifying at least one of the plurality of objects in a field of view of the imaging device; and modifying the at least one of the plurality of objects in media captured by the imaging device using one or more hardware-based actuators, wherein modifying the at least one of the plurality of objects causes the one of the plurality of objects to be concealed.

2. The computer-implemented method according to clause 1, wherein the hardware-based actuators include two or more of an autofocus actuator, an aperture actuator, a sensor actuator and an optical image stabilization (OIS) actuator.

3. The computer-implemented method according to any of clauses 1-2, further comprising modifying the at least one of the plurality of objects in a live preview image associated with the imaging device using one or more hardware-based actuators.

4. The computer-implemented method according to any of clauses 1-3, wherein the hardware-based actuators include an autofocus actuator, and wherein modifying the at least one of the plurality of objects comprises changing a focus of the imaging device using the autofocus actuator to alter a focus of the imaging device, wherein altering the focus of the imaging device causes the at least one of the plurality of objects to be blurred.

5. The computer-implemented method according to any of clauses 1-4, wherein the hardware-based actuators include an aperture actuator, and wherein modifying the at least one of the plurality of objects comprises changing an aperture setting of the imaging device using the aperture actuator to alter a depth of field and a field of view to remove the at least one of the plurality of objects from the media captured by the imaging device.

6. The computer-implemented method according to any of clauses 1-5, wherein the hardware-based actuators include a sensor actuator, and wherein modifying the at least one of the plurality of objects comprises cropping out a portion of the media including the at least one of the plurality of objects captured by the imaging device by displacing a sensor in an x-y direction using the sensor actuator.

7. The computer-implemented method according to any of clauses 1-6, wherein the hardware-based actuators include an optical image stabilization (OIS) actuator, and wherein modifying the at least one of the plurality of objects comprises cropping out a portion of the media including the at least one of the plurality of objects captured by the imaging device by displacing a sensor in an x-y direction using the OIS actuator, wherein the OIS actuator is configured to operate in a destabilization mode to create destabilization.

8. The computer-implemented method according to any of clauses 1-7, wherein the hardware-based actuators include an OIS actuator, and wherein modifying the at least one of the plurality of objects comprises blurring out a portion of the media including the at least one of the plurality of objects captured by the imaging device by displacing a sensor for the imaging device in an angular direction using the OIS actuator, wherein the OIS actuator is configured to operate in a destabilization mode to create destabilization.

9. The computer-implemented method according to any of clauses 1-8, wherein the hardware-based actuators include an OIS actuator, and wherein modifying the at least one of the plurality of objects comprises blurring out a portion of the media including the at least one of the plurality of objects captured by the imaging device by displacing a lens for the imaging device using the OIS actuator, wherein the OIS actuator is configured to operate in a destabilization mode to create destabilization.

10. The computer-implemented method according to any of clauses 1-9, wherein receiving the input comprises receiving user-based input from one or more input devices including a keyboard, a mouse, a game controller and a joystick.

11. The computer-implemented method according to any of clauses 1-10, wherein receiving the input comprises receiving the input from a machine learning model, wherein the machine learning model is trained to identify the plurality of objects.

12. The computer-implemented method according to any of clauses 1-11, wherein modifying the at least one of the plurality of objects comprises training a machine learning model using a plurality of images to determine a type and extent of modifying performed by each of the one or more hardware-based actuators; and executing the machine learning model to actuate a combination of the one or more hardware-based actuators to perform the modifying.

13. According to some embodiments, one or more non-transitory computer-readable media storing instructions that, when executed by one or more processors, cause the one or more processors to perform the steps of receiving input regarding a plurality of objects to be concealed in media captured by an imaging device; identifying at least one of the plurality of objects in a field of view of the imaging device; and modifying the at least one of the plurality of objects in media captured by the imaging device using one or more hardware-based actuators, wherein modifying the at least one of the plurality of objects causes the one of the plurality of objects to be concealed.

14. The one or more non-transitory computer-readable media according to clause 13, wherein the hardware-based actuators include an autofocus actuator, and wherein modifying the at least one of the plurality of objects comprises changing a focus of the imaging device using the autofocus actuator to alter a focus of the imaging device, wherein altering the focus of the imaging device causes the at least one of the plurality of objects to be blurred.

15. The one or more non-transitory computer-readable media according to any of clauses 13-14, wherein the hardware-based actuators include an aperture actuator, and wherein modifying the at least one of the plurality of objects comprises changing an aperture setting of the imaging device using the aperture actuator to alter a depth of field and a field of view to remove the at least one of the plurality of objects from the media captured by the imaging device.

16. The one or more non-transitory computer-readable media according to any of clauses 13-15, wherein the hardware-based actuators include a sensor actuator, and wherein modifying the at least one of the plurality of objects comprises cropping out a portion of the media including the at least one of the plurality of objects captured by the imaging device by displacing a sensor in an x-y direction using the sensor actuator.

17. The one or more non-transitory computer-readable media according to any of clauses 13-16, wherein the hardware-based actuators include an optical image stabilization (OIS) actuator, and wherein modifying the at least one of the plurality of objects comprises cropping out a portion of the media including the at least one of the plurality of objects captured by the imaging device by displacing a sensor in an x-y direction using the OIS actuator, wherein the OIS actuator is configured to operate in a destabilization mode to create destabilization.

18. According to some embodiments, a wearable device, comprising one or more memories that store instructions, and one or more processors that are coupled to the one or more memories and, when executing the instructions, are configured to receive input regarding a plurality of objects to be concealed in media captured by an imaging device; identify at least one of the plurality of objects in a field of view of the imaging device; and modify the at least one of the plurality of objects in media captured by the imaging device using one or more hardware-based actuators, wherein modifying the at least one of the plurality of objects causes the one of the plurality of objects to be concealed.

19. The wearable device according to clause 18, wherein the imaging device is comprised within a near-eye display (NED) system operating in an artificial reality environment.

20. The wearable device according to any of clauses 18-19, wherein the hardware-based actuators include at least two or more of an autofocus actuator, an aperture actuator, a sensor actuator and an optical image stabilization (OIS) actuator, wherein the OIS actuator comprises a Micro Electro-Mechanical System (MEMS) sensor-shift OIS actuator.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   receiving input regarding a plurality of objects to be concealed in media captured by an imaging device;
   identifying at least one of the plurality of objects in a field of view of the imaging device; and
   modifying the at least one of the plurality of objects in media captured by the imaging device using one or more hardware-based actuators, wherein modifying the at least one of the plurality of objects causes the one of the plurality of objects to be concealed.

2. The computer-implemented method of claim 1, wherein the hardware-based actuators include two or more of an autofocus actuator, an aperture actuator, a sensor actuator and an optical image stabilization (OIS) actuator.

3. The computer-implemented method of claim 1, further comprising:
   modifying the at least one of the plurality of objects in a live preview image associated with the imaging device using one or more hardware-based actuators.

4. The computer-implemented method of claim 1, wherein the hardware-based actuators include an autofocus actuator, and wherein modifying the at least one of the plurality of objects comprises changing a focus of the imaging device using the autofocus actuator to alter a focus of the imaging device, wherein altering the focus of the imaging device causes the at least one of the plurality of objects to be blurred.

5. The computer-implemented method of claim 1, wherein the hardware-based actuators include an aperture actuator, and wherein modifying the at least one of the plurality of objects comprises changing an aperture setting of the imaging device using the aperture actuator to alter a depth of field and a field of view to remove the at least one of the plurality of objects from the media captured by the imaging device.

6. The computer-implemented method of claim 1, wherein the hardware-based actuators include a sensor actuator, and wherein modifying the at least one of the plurality of objects comprises cropping out a portion of the media including the at least one of the plurality of objects captured by the imaging device by displacing a sensor in an x-y direction using the sensor actuator.

7. The computer-implemented method of claim 1, wherein the hardware-based actuators include an optical image stabilization (OIS) actuator, and wherein modifying the at least one of the plurality of objects comprises cropping out a portion of the media including the at least one of the plurality of objects captured by the imaging device by displacing a sensor in an x-y direction using the OIS actuator, wherein the OIS actuator is configured to operate in a destabilization mode to create destabilization.

8. The computer-implemented method of claim 1, wherein the hardware-based actuators include an OIS actuator, and wherein modifying the at least one of the plurality of objects comprises blurring out a portion of the media including the at least one of the plurality of objects captured by the imaging device by displacing a sensor for the imaging device in an angular direction using the OIS actuator, wherein the OIS actuator is configured to operate in a destabilization mode to create destabilization.

9. The computer-implemented method of claim 1, wherein the hardware-based actuators include an OIS actuator, and wherein modifying the at least one of the plurality of objects comprises blurring out a portion of the media including the at least one of the plurality of objects captured by the imaging device by displacing a lens for the imaging device using the OIS actuator, wherein the OIS actuator is configured to operate in a destabilization mode to create destabilization.

10. The computer-implemented method of claim 1, wherein receiving the input comprises receiving user-based input from one or more input devices including a keyboard, a mouse, a game controller and a joystick.

11. The computer-implemented method of claim 1, wherein receiving the input comprises receiving the input from a machine learning model, wherein the machine learning model is trained to identify the plurality of objects.

12. The computer-implemented method of claim 1, wherein modifying the at least one of the plurality of objects comprises:
   training a machine learning model using a plurality of images to determine a type and extent of modifying performed by each of the one or more hardware-based actuators; and
   executing the machine learning model to actuate a combination of the one or more hardware-based actuators to perform the modifying.

13. One or more non-transitory computer-readable media storing instructions that, when executed by one or more processors, cause the one or more processors to perform the steps of:
- receiving input regarding a plurality of objects to be concealed in media captured by an imaging device;
- identifying at least one of the plurality of objects in a field of view of the imaging device; and
- modifying the at least one of the plurality of objects in media captured by the imaging device using one or more hardware-based actuators, wherein
- modifying the at least one of the plurality of objects causes the one of the plurality of objects to be concealed.

14. The one or more non-transitory computer-readable media of claim 13, wherein the hardware-based actuators include an autofocus actuator, and wherein modifying the at least one of the plurality of objects comprises changing a focus of the imaging device using the autofocus actuator to alter a focus of the imaging device, wherein altering the focus of the imaging device causes the at least one of the plurality of objects to be blurred.

15. The one or more non-transitory computer-readable media of claim 13, wherein the hardware-based actuators include an aperture actuator, and wherein modifying the at least one of the plurality of objects comprises changing an aperture setting of the imaging device using the aperture actuator to alter a depth of field and a field of view to remove the at least one of the plurality of objects from the media captured by the imaging device.

16. The one or more non-transitory computer-readable media of claim 13, wherein the hardware-based actuators include a sensor actuator, and wherein modifying the at least one of the plurality of objects comprises cropping out a portion of the media including the at least one of the plurality of objects captured by the imaging device by displacing a sensor in an x-y direction using the sensor actuator.

17. The one or more non-transitory computer-readable media of claim 13, wherein the hardware-based actuators include an optical image stabilization (OIS) actuator, and wherein modifying the at least one of the plurality of objects comprises cropping out a portion of the media including the at least one of the plurality of objects captured by the imaging device by displacing a sensor in an x-y direction using the OIS actuator, wherein the OIS actuator is configured to operate in a destabilization mode to create destabilization.

18. A wearable device, comprising:

one or more memories that store instructions, and one or more processors that are coupled to the one or more memories and, when executing the instructions, are configured to:
- receive input regarding a plurality of objects to be concealed in media captured by an imaging device;
- identify at least one of the plurality of objects in a field of view of the imaging device; and
- modify the at least one of the plurality of objects in media captured by the imaging device using one or more hardware-based actuators, wherein
- modifying the at least one of the plurality of objects causes the one of the plurality of objects to be concealed.

19. The wearable device of claim 18, wherein the imaging device is comprised within a near-eye display (NED) system operating in an artificial reality environment.

20. The wearable device of claim 18, wherein the hardware-based actuators include at least two or more of an autofocus actuator, an aperture actuator, a sensor actuator and an optical image stabilization (OIS) actuator, wherein the OIS actuator comprises a Micro Electro-Mechanical System (MEMS) sensor-shift OIS actuator.

* * * * *